United States Patent [19]

Nakao et al.

[11] 4,188,838

[45] Feb. 19, 1980

[54] CONTROL APPARATUS OF A TRANSFER MECHANISM

[75] Inventors: Toshiyuki Nakao, Toyota; Kikuo Kato, Chita, both of Japan

[73] Assignee: Aisin Seiki Kabushiki Kaisha, Aichi, Japan

[21] Appl. No.: 796,598

[22] Filed: May 13, 1977

[30] Foreign Application Priority Data

May 13, 1976 [JP] Japan .......................... 51/60515[U]

[51] Int. Cl.² .............................................. F16H 37/08
[52] U.S. Cl. ................................. 74/701; 74/665 T; 74/665 GA
[58] Field of Search .................. 74/701, 705, 665 F, 74/665 G, 665 GA, 665 T, 358, 340

[56] References Cited

U.S. PATENT DOCUMENTS

| | | | |
|---|---|---|---|
| 2,853,890 | 9/1958 | Kelbel | 74/665 GA |
| 3,295,625 | 1/1967 | Ordorica et al. | 74/665 T X |
| 3,999,447 | 12/1976 | Halberg | 74/701 |
| 4,103,566 | 8/1978 | Kaler | 74/701 |

*Primary Examiner*—C. J. Husar
*Assistant Examiner*—Frank McKenzie
*Attorney, Agent, or Firm*—Oblon, Fisher, Spivak, McClelland & Maier

[57] ABSTRACT

A control apparatus of a transfer mechanism includes a case member, an input axle, an intermediate axle arranged parallel with the input axle, an output axle on the rear wheel side arranged parallel with the input axle and the intermediate axle, an output axle on the front wheel side coaxially arranged with the output axle on the rear wheel side, an input gear mounted on the input axle, a fixing member secured to the case member, an intermediate gear mounted on the intermediate axle and engaged with the input gear, an output gear coaxially arranged with the output axle of the front wheel axle and engaged with the intermediate gear, a simple planetary gear set including a carrier integrally connected to the output gear, a ring gear integrally connected to the output axle of rear wheel side, and a sun gear selectively engaged with the output axle on the front wheel side or the fixing member or the output axle on the front wheel side and the output gear, the mechanism further including a tubular axle integrally provided with the sun gear, a first sleeve always engaged with the tubular axle and selectively engageable with the fixing member or the output axle of front wheel side, and a second sleeve always engaged with the tubular axle and followed to the sliding movement of the first sleeve.

4 Claims, 5 Drawing Figures

CONTROL APPARATUS OF A TRANSFER MECHANISM

BACKGROUND OF THE INVENTION

1. Field of the Invention

The present invention relates generally to a control apparatus of a transfer mechanism and more particularly to a control apparatus of a transfer mechanism attached to a vehicle in which front and rear wheel drive is attained.

2. Description of the Prior Art

When a vehicle is turned, the turning radius of the front wheel is different from the turning radius of the rear wheel so that a difference in the rotational number is produced between the rotational numbers of the front wheel axle and the rear wheel axle.

Even when a vehicle goes straight, a difference between the effective diameters of the front and rear wheels is produced according to the difference between the air pressures of the respective tires, and a difference between the rotational numbers of the front and rear wheel axles is produced by the difference between the distances from the vehicle body to the road surface as a result of an uneven road surface.

Accordingly, a torque distribution to the front and rear output axles of a transfer mechanism is accomplished by means of a differential gear mechanism.

Generally, there are two types of differential gear mechanisms which are known as a bevel gear type and a planetary gear type. The planetary gear type is superior to the bevel gear type because a torque distribution ratio to the front and rear output axles can be voluntarily set up.

Various necessary conditions should be satisfied by a transfer mechanism so as to correspond to a running state of a vehicle such for example as; a direct condition of the front and rear output axles should be obtained, the torque distribution to the output axle of the front wheel side should be capable of being cut off, a speed changing function should be provided, and it is desirous that the transfer mechanism be of small size, light weight and inexpensive.

Conventionally, an excellent transfer mechanism is provided wherein a carrier of a simple planetary gear mechanism is integrally connected to an output gear which receives a torque from an input axle and an output axle of the rear wheel side and is integrally connected to a ring gear of the simple planetary gear mechanism, and a sun gear thereof is selectively connected to an output axle of the front wheel side or a fixing member or the output axle of the front wheel side and an output gear.

However such a transfer mechanism is not so constructed that a control apparatus for changing the connection between the sun gear and the output axle of the front wheel side or the fixing member or the output gear is suited at a desired shift pattern.

That is, in the conventional apparatus the rear wheel drive position (the sun gear is connected to the fixing member) is located between the four wheel drive position (the sun gear is connected to the output axle of front wheel side) and the direct connecting position of both output axles (the sun gear is connected to the output axle of the front wheel side and the output gear) but since the frequency of shift operation of the rear wheel drive position and the four wheel drive position is more than the direct connecting position of both output axles, it is desirable that the direct connecting position of both output axles and the rear wheel drive position be separately arranged at both sides of the four wheel drive position.

SUMMARY OF THE INVENTION

It is therefore an object of the present invention to provide an improved control apparatus of a transfer mechanism which obviates the drawbacks of the above-mentioned conventional transfer mechanism.

It is a further object of the present invention to provide a control apparatus of a transfer mechanism capable of obtaining a desired shift pattern wherein the direct connecting position of both the output axles and the rear wheel drive position be separately arranged at both sides of the four wheel drive position.

BRIEF DESCRIPTION OF THE DRAWINGS

The foregoing and other objects, features and attendant advantages of the present invention will be more apparent from the following description of preferred embodiments when considered in connection with the accompanying drawings, wherein.

DETAILED DESCRIPTION OF THE PREFERRED EMBODIMENTS

Figure 1:
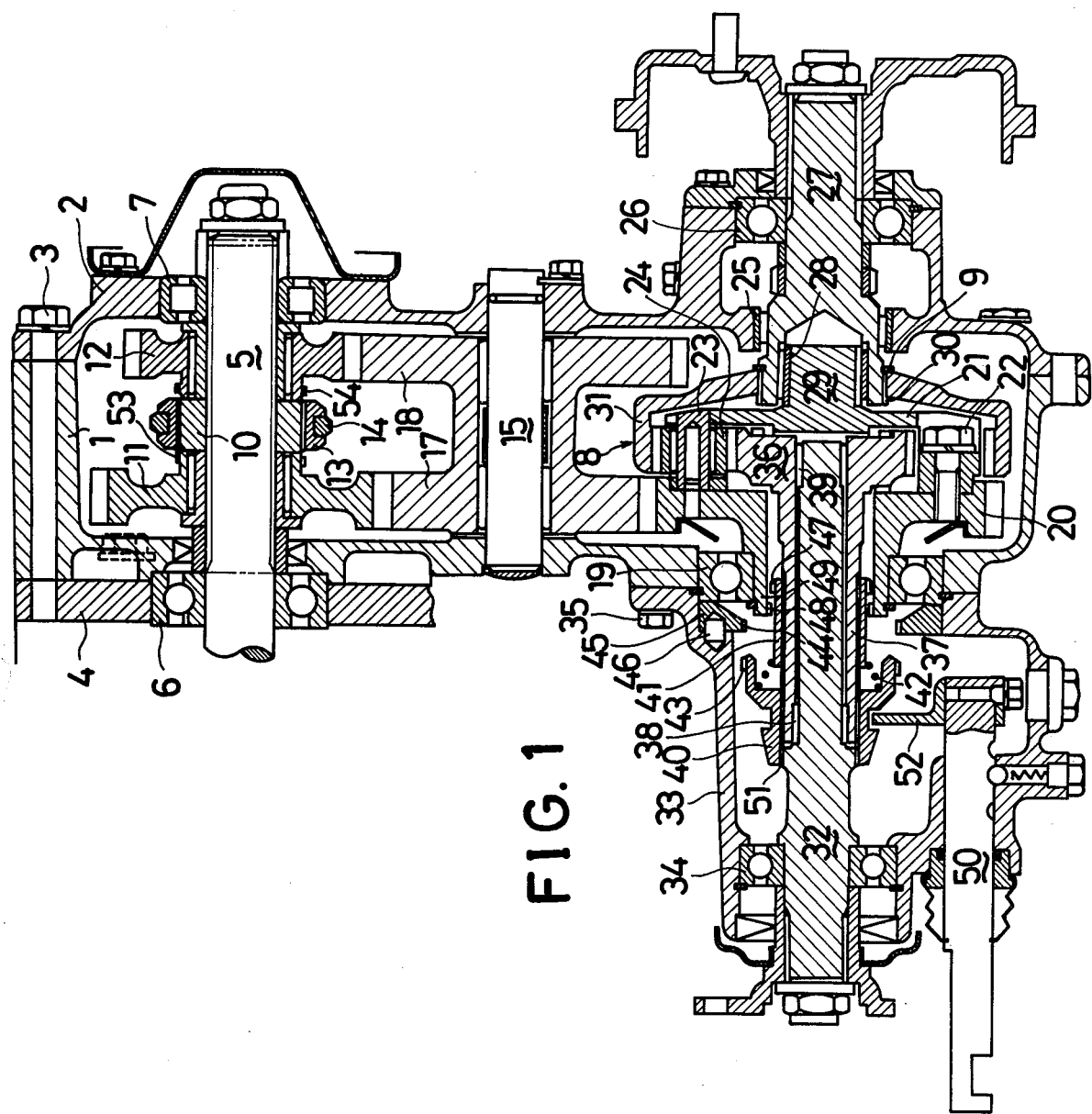
FIG. 1 is a sectional view of a transfer mechanism according to the present invention.

Referring now to the drawings and more particularly to FIG. 1 wherein there is shown a front case 1 fixed to a transmission case 4 and having a rear case 2 connected by means of a bolt 3.

An input axle 5 serves as an output axle of a transmission (not shown) and is rotatably supported by a bearing 6 fixed to the transmission case 4 and a bearing 7 fixed to the rear case 2.

A high speed input gear 11 and a low speed input gear 12 are respectively rotatably arranged against the input axle 5.

A hub 10 is disposed between both input gears 11, 12 on the input axle 5 and is engaged with the input axle 5 by a spline engagement.

A sleeve 13, fixed on the hub 10, is engaged with the hub 10 by a spline engagement, and a shift fork 14 is engaged with the sleeve 13. Therefore, the sleeve 13 is slidably leftwardly and rightwardly moved on the hub 10 by operating a shift lever (not shown), and an inner spline of the sleeve 13 can be engaged with an outer spline 53 of the high speed input gear 11 or an outer spline 54 of the low speed input gear 12.

An intermediate axle 15 is supported by both cases 1, 2 and is nonrotatable.

Intermediate gears 17, 18 are integral with each other and are rotatably supported by the intermediate axle 15. The intermediate gear 17 is meshed with the high speed input gear 11 and the intermediate gear 18 is meshed with the low speed input gear 12.

An output axle 27 on the rear wheel side is rotatably supported by bearings 25, 26 fixed to the rear case 2 and is tubular at the left end portion and an axle portion 29 of a carrier 21 of a simple planetary gear apparatus 8 is fixedly inserted into the tubular portion of the output axle 27 on the rear wheel side through a bearing 28. An output gear 20 meshed with the intermediate gear 17 is located at the left side of the simple planetary gear apparatus 8, and a tubular axle 49 of the output gear 20 is rotatably supported by a bearing 19 fixed to an extension housing 33.

The output gear 20 and the carrier 21 are integrally connected to each other by a bolt 22. A pinion axle 23 is fixed to the carrier 21 and rotatably supports a pinion 24. A ring gear 31 meshed with the pinion 24 is engaged with a left end portion of the output axle 27 on the rear wheel side by a spline engagement and the sliding movement of the ring gear 31 against the output axle 27 on the rear wheel side is blocked by a shoulder portion 30 and a stopper ring 9 of the output axle 27 on the rear wheel side. The extension housing 33 is fixed to the front case 1 by means of a bolt 35 and a bearing 34 fixed to the extension housing 33 rotatably supports an output axle 32 on the front wheel side.

The output axle 32 on the front wheel side is coaxially located with the output axle 27 on the rear wheel side and a right end portion thereof reaches to a tubular portion of a sun gear 36 meshed with the pinion 24. The sun gear 36 is provided with a tubular axle 37 which passes through between an outer circumference of the output axle 32 on the front wheel side and an inner circumference of output gear 20 and is located on the output axle 32 on the front wheel side by bearings 38, 39.

First and second sleeves 40, 41 are located on the tubular axle 37 and are always engaged therewith by a spline engagement. A shift fork 52 engaged with the first sleeve 40 is fixed to a shift fork axle 50 which is connected to a shift lever (not shown) to thereby leftwardly or rightwardly slide the first sleeve 40. There are three positions of the first sleeve 40 including a first position shown by FIG. 3, a second position shown by FIGS. 1 and 2 and a third position shown by FIG. 4. In the second and third positions of first sleeve 40, an inner spline 55 of first sleeve 40 is engaged with an outer spline 51 of the output axle 32 on the front wheel side, and in the first position thereof an outer spline 43 of the first sleeve 40 is engaged with an inner spline 44 of a fixing member 45 fixed to the extension housing 33 by a pin 46. A spring 42 disposed between the first and second sleeves 40, 41 is connected to the first sleeve 40 at one end thereof and to the second sleeve 41 at the other end thereof. When the first sleeve 40 is leftwardly or rightwardly slid the second sleeve 41 follows therewith.

Figure 2:
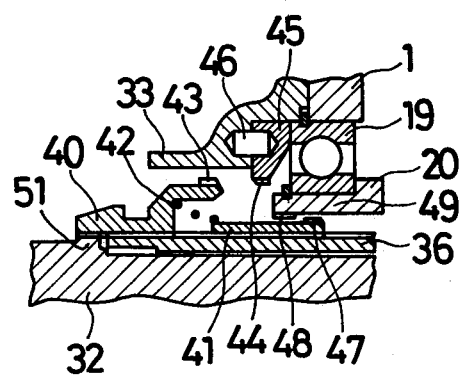
FIGS. 2–5 are views showing the control apparatus cut away and similar to FIG. 1 showing the operative steps of the control apparatus.
Figure 3:
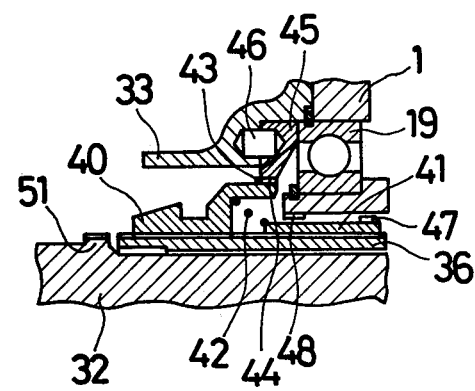
Figure 5:
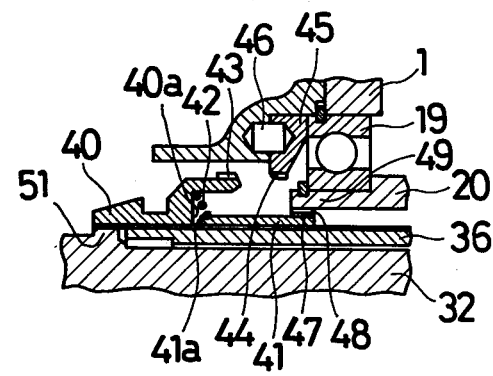

Accordingly there are also three positions of the second sleeve 41 including a first position shown by FIG. 3, a second position shown by FIGS. 1 and 2 and a third position shown by FIG. 5. In the third position of the second sleeve 41, an outer spline 47 of the second sleeve 41 is engaged with an inner spline 48 of a tubular axle 49 of output gear 20. The distance between the first and second positions of the first sleeve 40 is longer than the distance of opposite ends of both sleeves 40, 41 at the states in which the first sleeve 40 is located at the third position thereof and the second sleeve 41 is located at the second position thereof. When the first sleeve 40 is slid from the above-mentioned state to the first position, both sleeves 40, 41 contact each other and the spline engagement between the first sleeve 41 and the output gear 20 is disengaged and then the first sleeve 40 is engaged with the fixing member 45 by a spline engagement.

The operation according to this invention is as follows:

In the case where a vehicle travels at high speed on a snow or ice covered road using a four wheel drive, the sleeve 13 is engaged with the high speed input gear 11 by operating a shift lever (not shown), and the first sleeve 40 is located at the second position (FIGS. 1, 2) and is engaged with the output axle 32 on the front wheel side. Accordingly, the rotational torque input to the input axle 5 is transmitted from the hub 10 to the carrier 21 of simple planetary gear apparatus 8 via sleeve 13, high speed input gear 11, intermediate gear 17, and output gear 20 and is distributed into two by the simple planetary gear apparatus 8 of which one is transmitted from the ring gear 31 to the output axle 27 on the rear wheel side and of which the other is transmitted from the sun gear 36 to the output axle 32 on the front wheel side via the first sleeve 40. At this time the torque distribution ratio to both output axles 32, 27 on the front and rear wheel sides is decided by the ratio between the number of gears $Z_s$ of sun gear 36 and the number of gears $Z_r$ of ring gear 31. If the most desirable value [torque of the output axle on the front wheel side: torque of the output axle on the rear wheel side] is [40:60], it is settled up as $[Z_s:Z_r=40:60]$.

In the case where a vehicle is travelling at high speed on a highway by means of rear wheel drive, the sleeve 13 is engaged with the high speed input gear 11 by operating a shift lever (not shown), and the first sleeve 40 is located at the first position (FIG. 3) and is engaged with the fixing member 45.

The sun gear 36 in such condition is non-rotatable because of the spline engagement between the first sleeve 40 and the fixing member 45 and all the rotational torque transmitted from the input axle 5 to the carrier 21 is transmitted from the ring gear 31 to the output axle 27 on the rear wheel side, and the ring gear 31 and the output axle 27 on the rear wheel side are rotated at higher speed than carrier 21.

If the changing ratio $i_1$ of the simple planetary gear apparatus 8 is settled up at the ratio of $[Z_s/Z_r=40/60]$, it becomes $$[i_1 = \frac{1}{1 + Z_s/Z_r} = \frac{1}{1 + 40/60} = 0.6].$$

If the ratio of the number of gears of the output gear 20 against the number of the high speed input gear 11 is $i_2$, the changing ratio $i_3$ of the output axle 27 on the rear wheel side against the input axle 5 is $i_1 \cdot i_2$. If the value of $i_3$ is desired to be 0.8 according to engine output and transmission, $i_2$ becomes nearly equal to 1.33.

In the case where a vehicle is travelling at low speed on a steep uphill road, a mud road, a sand road, an uneven road or the like, by means of four wheel drive, the sleeve 13 is engaged with the low speed input gear 12 by operating a shift lever (not shown), and the first sleeve 40 is located at the second position (FIGS. 1, 2) and is engaged with the output axle 32 on the front wheel side. Accordingly, the rotational torque input to the input axle 5 is transmitted from the hub 10 to the carrier via sleeve 13, low speed input gear 12, intermediate gear 18, intermediate gear 17 and output gear 20 and is distributed into two by the simple planetary gear apparatus 8 and is transmitted to both output axles 32, 27 on the front and rear wheel sides.

Figure 4:
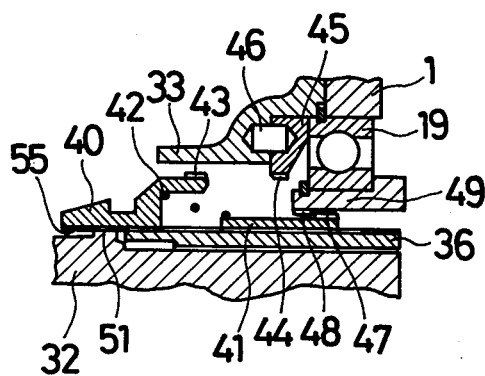

In the event one of the front and rear wheels slips during slow speed running by four wheel drive and a vehicle becomes impossible to run, the sleeve 13 is engaged with the low speed input gear 12 by operating a shift lever (not shown), and the first sleeve 40 is located at the third position (FIG. 4) and the second sleeve 41 is pulled by means of spring 42. At this time, when the outer spline 47 of second sleeve 41 and the inner spline 48 of output gear 20 meet with each other, the movements of first sleeve 40 to the third position (FIG. 4) and the second sleeve 41 to the third position (FIG. 5) are simultaneously achieved, and when the outer spline 47 of the second sleeve 41 and the inner spline 48 of the output gear 20 do not meet with each other, the first sleeve 40 is moved to the third position (FIG. 4) and the second sleeve 41 is not moved to the third position (FIG. 5) as shown in FIG. 4 because of the urging force of spring 42, and when the outer spline 47 of the second sleeve 41 and the inner spline 48 of output gear 20 thereafter meet with each other, the second sleeve 41 is moved to the third position (FIG. 5) by the urging force of spring 42 and is engaged with the output gear 20.

Accordingly, the differential gear function of the simple planetary gear apparatus 8 is lost, both output axles 32, 37 on the front and rear sides are directly connected and the torque of output gear 20 is directly transmitted to both output axles 32, 37 on the front and rear sides.

When the torque is acted on between the second sleeve 41 and the output gear 20 in the state that the second sleeve 41 is engaged with the output gear 20, the sliding resistance between the second sleeve 41 and the output gear 20 is large so that the second sleeve 41 is not moved by the contracting operation of spring 42, (as shown in FIG. 5) even when the first sleeve 40 is moved from the third position (FIG. 4) to the second position (FIGS. 1, 2), and when the above-mentioned torque is thereafter dissolved, the second sleeve 41 is moved by the urging force of spring 42 to thereby disengage the engagement with the output gear 20.

When the first sleeve 40 is moved from the state of FIG. 5 to the first position (FIG. 3), a right end 40a of the first sleeve 40 is contacted with a left end 41a of the second sleeve 41 and the second sleeve 41 is pushed, and the second sleeve 41 is disengaged from the output gear 20 and thereafter the first sleeve 40 is engaged with the fixing member 45.

The above described embodiment can be constructed such that the hub 10, sleeve 13, low speed input gear 12 and intermediate gear 18 are not used and the high speed input gear 11 is always connected to the input axle 10.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A control apparatus of a transfer mechanism comprising:
    a case member;
    an intermediate axle arranged parallel with said input axle;
    an output axle on the rear wheel side arranged parallel with said input axle and said intermediate axle;
    an output axle on the front wheel side coaxially arranged with said output axle on said rear wheel side;
    an input gear mounted on said input axle;
    a fixing member secured to said case member;
    an intermediate gear mounted on said intermediate axle and engaged with said input gear;
    an output gear coaxially arranged with said output axle on the front wheel axle and engaged with said intermediate gear;
    a simple planetary gear set including a carrier integrally connected to said output gear, a ring gear integrally connected to said output axle on the rear wheel side, and a sun gear selectively engaged with said output axle on the front wheel side or said fixing member or said output axle on the front wheel side and said output gear;
    said mechanism further comprising a tubular axle integrally provided with said sun gear, a first sleeve always engaged with said tubular axle and selectively engageable with said fixing member or said output axle on the front wheel side, and a second sleeve always engaged with said tubular axle for following the sliding movement of said first sleeve.

2. A control apparatus of a transfer mechanism as set forth in claim 1, wherein said mechanism further comprises a spring interposed between said first and second sleeves so as to move said first and second sleeves.

3. A control apparatus of a transfer mechanism as set forth in claim 1, wherein said first sleeve is engageable with said fixing member at a first position thereof and is engageable with said output axle on the front wheel side at second and third positions thereof.

4. A control apparatus of a transfer mechanism as set forth in claim 1, wherein said second sleeve is engageable with said output gear.

* * * * *